(12) United States Patent
Moon

(10) Patent No.: US 6,181,928 B1
(45) Date of Patent: *Jan. 30, 2001

(54) METHOD AND APPARATUS FOR EVENT NOTIFICATION FOR WIRELESS DEVICES

(75) Inventor: Billy Gayle Moon, Apex, NC (US)

(73) Assignee: Ericsson Inc., Research Triangle Park, NC (US)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/915,981

(22) Filed: Aug. 21, 1997

(51) Int. Cl.[7] .......................... H04M 3/42; H04M 11/10; H04M 1/64
(52) U.S. Cl. .......................... 455/415; 455/412; 455/414; 379/88.12
(58) Field of Search .................... 379/142, 88.12, 379/88.26, 215, 127, 67.1, 88.25, 100.06, 93.24, 108.08, 93.14, 93.23, 88.19, 88.21; 455/412, 413, 414, 415

(56) References Cited

U.S. PATENT DOCUMENTS

| 4,582,956 | * | 4/1986 | Doughty ............................. 379/93.14 |
| 5,329,578 | * | 7/1994 | Brennan et al. ................... 379/88.19 |

(List continued on next page.)

FOREIGN PATENT DOCUMENTS

| 297 18348 | 12/1997 | (DE) . |
| 0 736 989 | 4/1996 | (EP) . |
| WO 96/25817 | 8/1996 | (WO) . |
| WO 97/39562 | 10/1997 | (WO) . |

OTHER PUBLICATIONS

PCT International Search Report, Dec. 9, 1998, File No. PCT/US 98/17171.

Neuer, "Personal Communication in Traditional Cellular Networks", Apr. 1996, Proceedings of the SPIE vol. 2602, pp. 184–195.

Mouly, et al., Current Evolution of the GSM Systems, Oct., 1995, IEEE Personal Communications, vol. 2, No. 5, pp. 9–19.

* cited by examiner

Primary Examiner—Reinhard J. Eisenzopf
Assistant Examiner—Charles N. Appiah
(74) Attorney, Agent, or Firm—Jenkens & Gilchrist, P.C.

(57) ABSTRACT

To provide message waiting notification in a wireless client/server environment, the server initiates a telephone call to the client using a telephone number assigned for message waiting notification. The server inserts a telephone number assigned for message waiting notification into a calling party number field and information pertaining to the message received into a calling party name field of the sent caller identification information. The telephone network then pages the client in response to the initiated telephone call. The server then terminates the telephone call.

Upon receiving the page, a caller identification device positioned within the client receives the caller identification information sent with the initialed telephone call. The client compares the telephone number contained within the calling party member field of the caller identification information against the assigned telephone number. A match indicates that the call is a message waiting notification. The client further reads the calling party name field of the caller identification information to receive the information pertaining to the received message.

15 Claims, 3 Drawing Sheets

U.S. PATENT DOCUMENTS

| | | | | |
|---|---|---|---|---|
| 5,363,431 | * | 11/1994 | Schull et al. | 379/88.12 |
| 5,521,964 | * | 5/1996 | Schull et al. | 379/88.12 |
| 5,574,779 | * | 11/1996 | Ely et al. | 379/207 |
| 5,615,252 | * | 3/1997 | Sizer, II et al. | 379/142 |
| 5,675,631 | * | 10/1997 | Kaminsky et al. | 379/67.1 |
| 5,717,741 | * | 2/1998 | Yue et al. | 379/88.12 |
| 5,758,279 | * | 5/1998 | Foti | 455/413 |
| 5,764,733 | * | 6/1998 | Kaminsky et al. | 379/67.1 |
| 5,802,466 | * | 9/1998 | Gallant et al. | 455/413 |
| 5,805,587 | * | 9/1998 | Norris et al. | 370/352 |
| 5,806,000 | * | 9/1998 | Vo et al. | 455/466 |
| 5,809,128 | * | 9/1998 | McMullin | 379/215 |
| 5,832,072 | * | 11/1998 | Rozenblit | 379/246 |
| 5,841,850 | * | 11/1998 | Fan | 379/142 |
| 5,848,362 | * | 12/1998 | Yamashita | 455/567 |
| 5,850,519 | * | 12/1998 | Vazana | 395/200.36 |
| 5,889,839 | * | 3/1999 | Beyda et al. | 379/88.12 |
| 5,944,786 | * | 8/1999 | Quinn | 709/206 |
| 5,974,449 | * | 10/1999 | Chang et al. | 709/206 |
| 5,995,594 | * | 11/1999 | Shaffer et al. | 379/88.12 |
| 6,006,087 | * | 12/1999 | Amin | 455/413 |
| 6,014,559 | * | 3/1999 | Amin | 455/413 |
| 6,061,570 | * | 5/2000 | Janow | 455/458 |

METHOD AND APPARATUS FOR EVENT NOTIFICATION FOR WIRELESS DEVICES

BACKGROUND OF THE INVENTION

1. Technical Field of the Invention

The present invention pertains in general to event notification in a client/server environment, and more particularly, to a method and apparatus for message waiting notification in a client/server environment wherein the client and server communicate via a wireless network.

2. Description of Related Art

Wireless data systems which use a client/server architecture are being developed with the principal data service of these data systems being messaging such as, E-mail, fax-mail and voice-mail, among others. In a client/server environment, when a server receives messages for a client, it would be beneficial if a message waiting notification could be sent to alert the client. Although the server could "call" the client to provide the client message waiting notification, all public standards for client/server architectures do not allow the server to call the client. Instead, the client is required to call the server and establish a "session" before notification and other information can be transferred from the server to the client.

In certain applications, such as a circuit data system used in standard analog cellular telephone systems, no notification mechanism exists. In other applications, solutions to address the problem of message waiting notification have been developed, however, each has a drawback. For example, in a Cellular Digital Packet Data (CDPD) system, mobile clients are assigned a fixed Internet Protocol (IP) address. Mobile clients are required to "log into" the server and maintain a continuous connection. The server can then deliver information to the mobile client at any time since a virtual connection is continuously maintained. IP addresses, however, are limited in number and the use of fixed IP addresses required by the Cellular Digital Packet Data system requires the coordination of all mobile device manufacturers.

It has also been suggested that a Short Message Service (SMS) of a mobile telephone system be used as a message waiting notification vehicle. SMS allows a short message to be delivered to a mobile client. This message can be coded with a standard format such that the client recognizes the SMS message as a message waiting notification. SMS, however, is not a reliable notification system. In many mobile telephone systems, SMS is only provided as a secondary service to voice traffic. Therefore, in heavily loaded mobile telephone systems, SMS messages can be delayed indefinitely making SMS an unreliable notification mechanism. Additionally, SMS messages are typically delivered for a fee and many users may not wish to pay for notification messages.

There is a need therefore, for an efficient, reliable and inexpensive method and apparatus for providing message waiting notification from a server to a client in a wireless client/server architecture.

SUMMARY OF THE INVENTION

The present invention comprises a method and an apparatus for effectuating message waiting notification to a client that a server has received a message for the client. Upon receiving a message addressed to the client, the server initiates a telephone call to the client which includes caller identification information. The server inserts a telephone number assigned for message waiting notification into a calling party number field and information pertaining to the message received into a calling party name field of the sent caller identification information. The telephone network then pages the client in response to the initiated telephone call. The server then terminates the telephone call.

Upon receiving the page, a caller identification device positioned within the client receives the caller identification information sent with the initiated telephone call. The client compares the telephone number contained within the calling party number field of the caller identification information against the assigned telephone number. A match indicates that the call is a message waiting notification. The client further reads the calling party name field of the caller identification information to receive the information pertaining to the received message.

BRIEF DESCRIPTION OF THE DRAWINGS

For a more complete understanding of the present invention, reference is made to the following detailed description taken in conjunction with the accompanying drawings wherein.

DETAILED DESCRIPTION OF THE INVENTION

Figure 1:
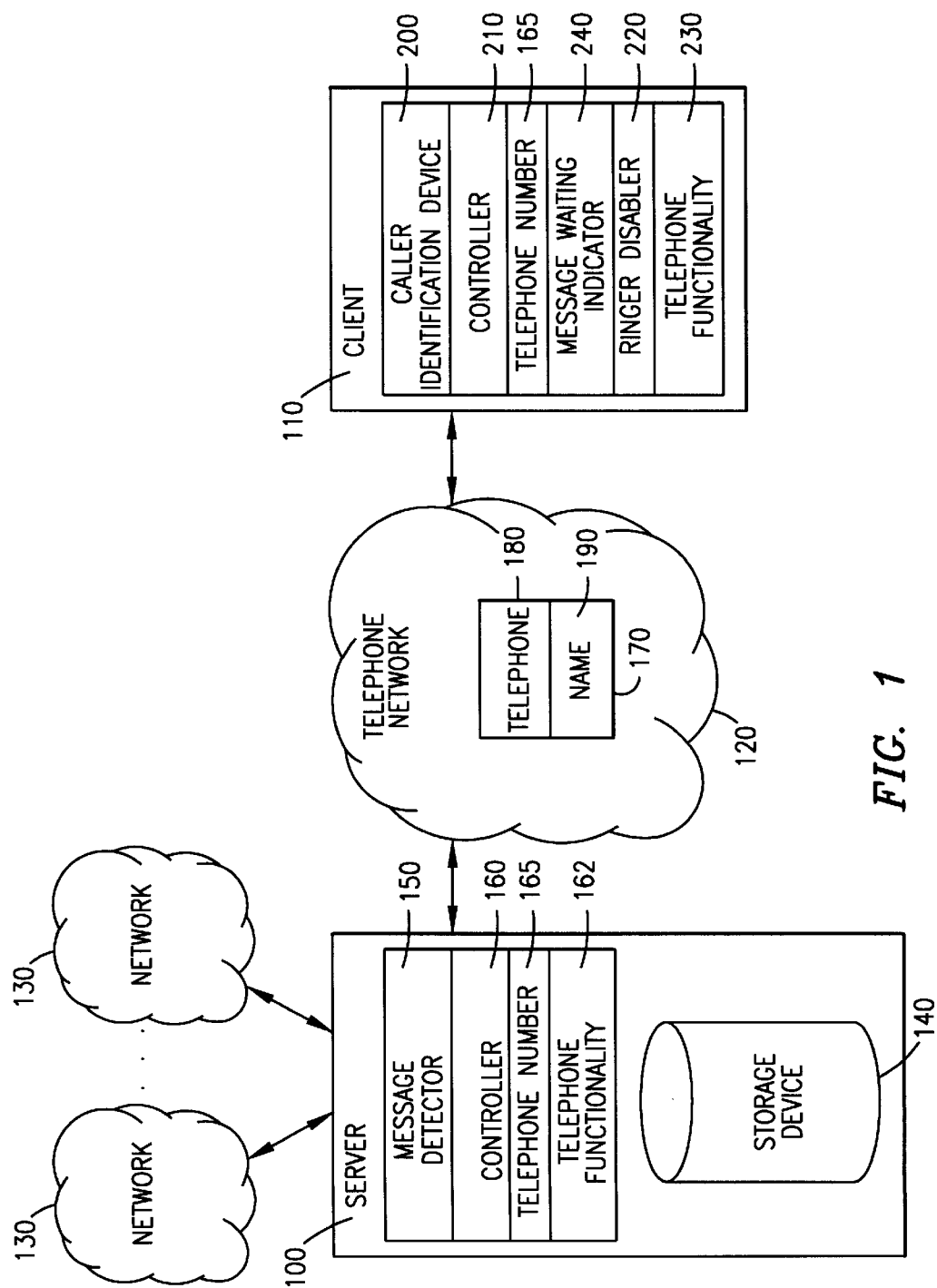
FIG. 1 is a functional block diagram of an apparatus for communicating a message waiting notification to a client from a server.

Referring now to FIG. 1, there is illustrated a functional block diagram of an apparatus for communicating a message waiting notification to a client from a server. A server 100 communicates with a client 110 via a wireless telephone network 120. The server 100 and the client 110 further communicate with various other devices via a plurality of communication networks 130.

When a message is received by the server 100 addressed to the client 110, the server 100 stores the message in a storage device 140. A message detector 150 detects the arrival of the message and alerts a controller 160. In response to the message detection, the controller 160 initiates a telephone call from telephone functionality 162 connected to the server 100 to telephone functionality 230 connected to the client 110.

When the telephone call is initiated by the server 100, caller identification information 170 is created. The caller identification information 170 includes a telephone number field 180 containing the telephone number of a calling party and a name field 190 typically containing a name of the calling party assigned the telephone number listed in the telephone number field 180. The telephone number field 180 and the name field 190 are typically inserted with information by the telephone network 120; however, in the preferred embodiment, the server 100 is integrated into the telephone network 120 so as to allow the server 100 to insert the information 170. The server 100 inserts a telephone number 165 into the telephone number field 180. The telephone number 165 is preprogrammed into both the server 100 and the client 110 and is indicative of a waiting message and is used solely by the server 100 to notify the client 110 that the message has arrived at the server 100. Since the client 110 is programmed with the telephone number 165, the client 110 does not require calling party name information to be inserted into the name field 190. Rather than inserting the server 100 name information into the name field 190, the server 100 instead, inserts information pertaining to the particular message received such as, message type, message size, or message source, among others into the name field 190.

To establish the telephone connection between the server 100 and the client 110, the telephone network sends a page to the client 110. Once the page is sent, however, the server 100 terminates the telephone call. Nevertheless, a caller identification device 200, located within the client 110, is alerted by the page and receives the caller identification information 170 sent with the initiated telephone call. The caller identification device 200 communicates the contents of the telephone number field 180 and the name field 190 of the caller identification information 170 to a controller 210 located within the client 110. The controller 210 compares the contents of the telephone number field 180 against the preprogrammed telephone number 165. If the controller 210 identifies the contents of the telephone number field 180 as matching the telephone number 165, the controller 210 determines that the incoming telephone call is a message waiting notification and not an actual telephone call. As such, the controller 210 activates a ringer disabler 220 to prevent the telephone functionality 230 from ringing in response to the page and initiated telephone call.

The client 110 also includes a message waiting indicator 240. The message waiting indicator 240 comprises any indicating device such as, an audible tone, a light emitting diode, or an alphanumeric display, among others. Upon receipt of the caller identification information 170 indicative of the message waiting notification, the controller 210 activates the message waiting indicator 240. The information pertaining to the received message contained in the name field 170 and communicated to the controller 210 is stored in the controller 210. This information can either be retrieved from the controller 210 by the user or, in applications where the message waiting indicator 240 is an alphanumeric display, the controller 210 displays the information on the display 240.

Figure 2:
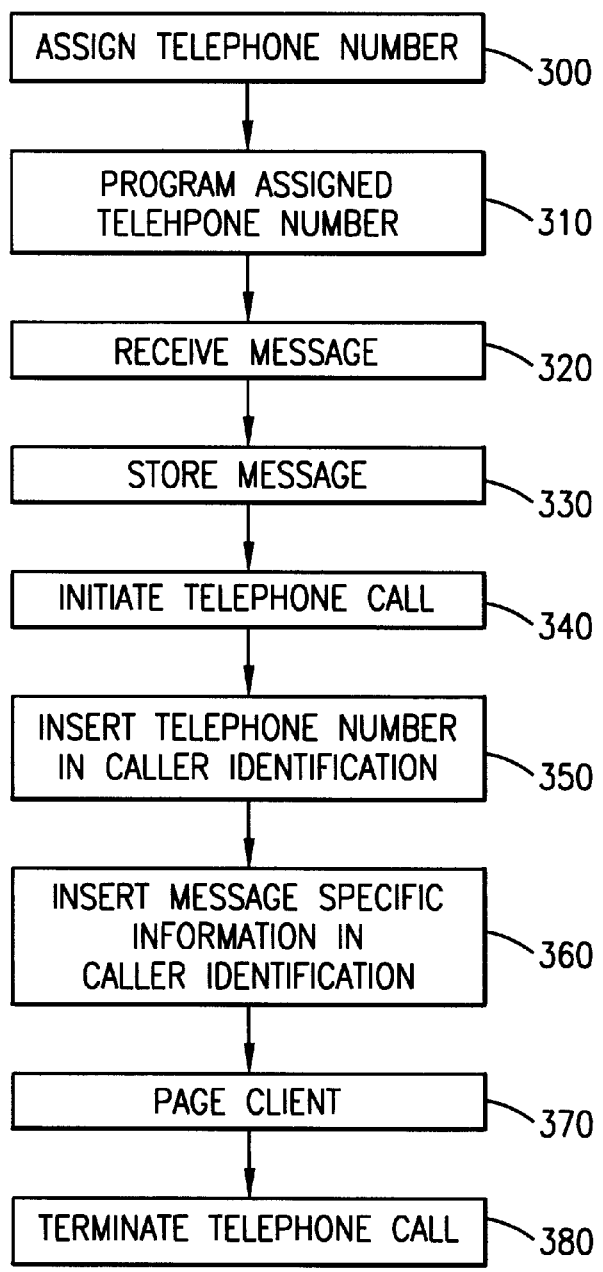
FIG. 2 is a flow diagram of a method for sending a message waiting notification to a client from a server.

Referring additionally now to FIG. 2, there is illustrated a flow diagram of a preferred method for sending message waiting notification to the client 110 from the server 100. The telephone number 165 is assigned as the calling party telephone number indicative of the message waiting notification (step 300) and is programmed into the server 100 and the client 110 (step 320). The server 100 receives a message addressed to the client (step 320) and stores the message in the storage device 140 (step 330). The server 100 initiates a telephone call to the client 110 over the telephone network 120 (step 340). The server 100 inserts the telephone number 165 into the telephone number field 180 of the caller identification information 170 (step 350). Alternatively, the telephone number 165 can be inserted into the telephone number field 180 by the telephone network 120 (step 350). The server 100 inserts information pertaining to the particular message received, such as, message type, message size or message source, among others, into the name field 190 of the caller identification information 170 (step 360). The telephone network 120 sends a page to the client 110 (step 370) and the server 100 terminates the telephone call (step 380).

Figure 3:
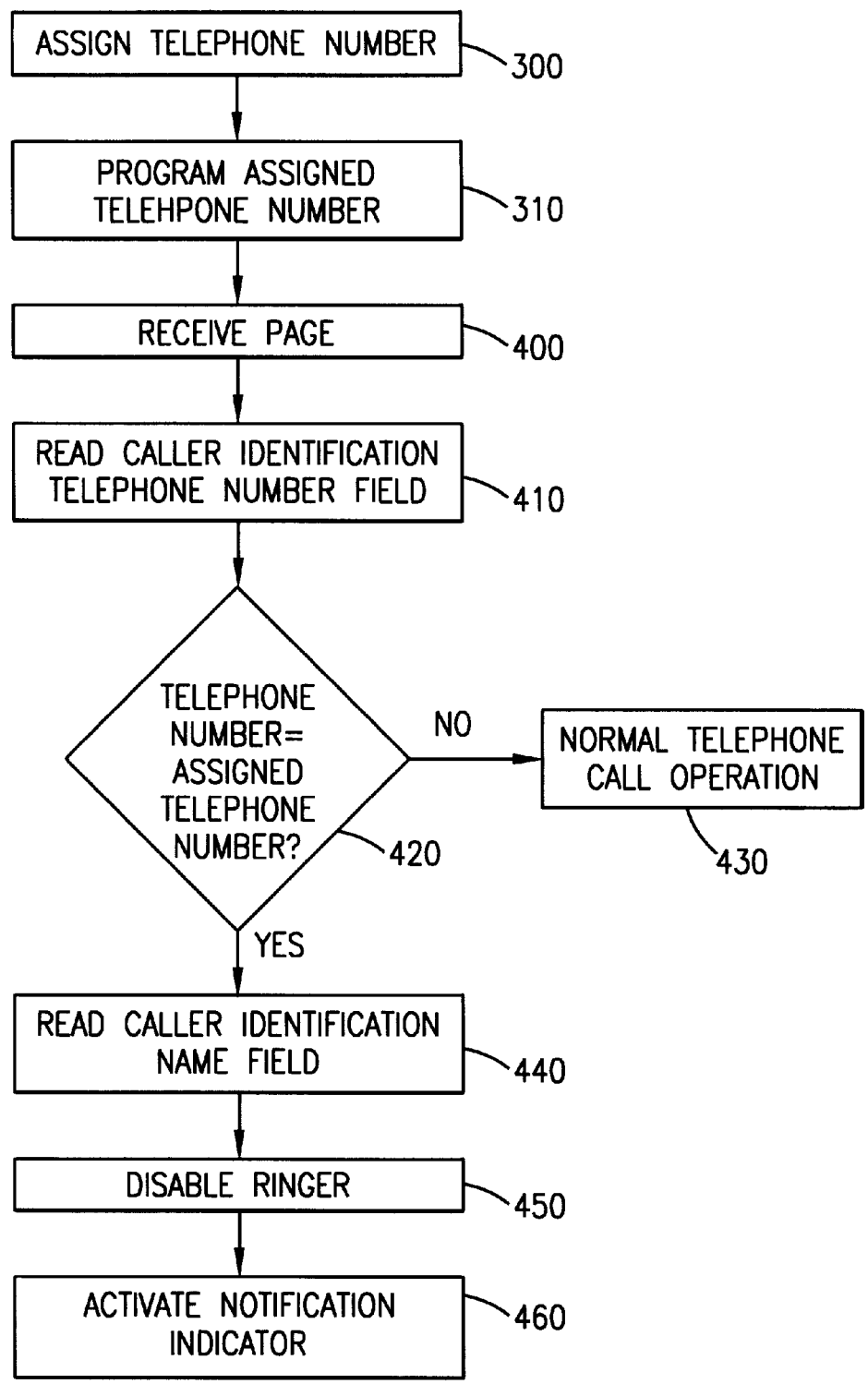
FIG. 3 is a flow diagram of a method for receiving a message waiting notification by a client from a server.

Referring additionally now to FIG. 3, there is illustrated a flow diagram of a preferred method for receiving a message waiting notification by the client 110 from the server 100. The telephone number 165 is assigned as the telephone number indicative of the message waiting notification (step 300) and is programmed into the server 100 and the client 110 (step 320). The client 110 receives a page including caller identification information 170 (step 400). The caller identification device 200 reads the caller identification telephone number field 180 and communicates its contents to the controller 210 (step 410). The controller 210 compares the contents of the telephone number field 170 against the preprogrammed telephone number 165 (step 420). If the two numbers do not match, the client 110 proceeds as if the incoming call is a non-notification telephone call (step 430). Otherwise, if the numbers match, the incoming telephone call is the message waiting notification and the controller 210 reads the name field 190 of the caller identification information 170 (step 440). The controller 210 disables the ringer of the telephone functionality 230 connected to the client 110 (step 450) and activates the notification indicator 230 (step 460).

Although a preferred embodiment of the method and apparatus of the present invention has been illustrated in the accompanying Drawings and described in the foregoing Detailed Description, it is understood that the invention is not limited to the embodiment disclosed, but is capable of numerous rearrangements, modifications, and substitutions without departing from the spirit of the invention as set forth and defined by the following claims.

What is claimed is:

1. A server for sending a notification to a client over a telephone network that the server has received a message for the client, the server comprising:

a message detector for detecting when the server has received a message for the client; and a controller for initiating a telephone call to the client over the telephone network, the controller further for inserting an assigned telephone number, other than the telephone number of the server initiating the telephone call, indicative of a message waiting notification, into a calling party telephone number field of caller identification information transmitted to the client from the server over the telephone network in association with the initiated telephone call, the controller still further for inserting information pertaining to characteristics of the received message in a calling party name field of the caller identification information transmitted to the client from the server over the telephone network in association with the initiated telephone call.

2. The apparatus, as recited in claim 1, wherein the information inserted into the calling party name field of the caller identification information is information pertaining to a type of the message.

3. The apparatus, as recited in claim 1, wherein the information inserted into the calling party name field of the caller identification information is information pertaining to a size of the message.

4. The apparatus, as recited in claim 1, wherein the information inserted into the calling party name field of the caller identification information is information pertaining to a source of the message.

5. A client for receiving notification from a server over a telephone network that the server has received a message for the client, the client comprising:

a caller identification device for identifying a calling party telephone number inserted in caller identification information by the server initiating an incoming telephone call and received within the incoming telephone call to the client over the telephone network; and a controller for comparing the identified telephone number inserted in the caller identification information by the server initiating the incoming telephone call with an assigned telephone number other than a telephone number of the server indicative of message waiting notification wherein a match between the telephone number inserted in the caller identification information by the server initiating the incoming telephone call and the assigned telephone number provides notification of the existence of the received message, the controller still further for reading a calling party name field inserted in the caller identification information by the server initiating the incoming telephone call, the calling party name field containing information pertaining to characteristics of the received message.

6. The apparatus recited in claim 5, further comprising an indicator for displaying notification that the server has received the message for the client.

7. The apparatus recited in claim 6, wherein the indicator is a light emitting diode.

8. The apparatus recited in claim 6, wherein the indicator is an alphanumeric display.

9. The apparatus recited in claim 5, wherein the controller displays the information contained in the name field on an alphanumeric display.

10. The apparatus recited in claim 5, further comprising a ringer disabler for disabling a ringer of a telephone connecting the client to the telephone network when the identified telephone number matches the assigned telephone number indicative of message waiting notification.

11. The method for sending a message notification from a server to a client over a telephone network that the server has received a message for the client, comprising the steps of:

assigning, at the server, a telephone number, other than the telephone number of the server, for use in notifying the client over the telephone network of the received message, the telephone number indicative of the existence of the received message;

inserting, at the server, the assigned telephone number indicative of the message waiting notification into a calling party telephone number field of caller identification information created when the telephone call is initiated; and calling the client the client over the telephone network.

12. A method recited to claim 11, wherein the client is connected to the telephone network via a mobile telephone.

13. A method for receiving a message waiting notification from a server at a client that the server has received a message for the client, comprising the steps of:

programming the client with an assigned telephone number for identifying the message waiting notification to the client, the assigned telephone number indicative of the existence of the received message waiting notification and not corresponding to a telephone number of the server;

receiving a call at the client from the server over the telephone network;

reading a calling party telephone number field included in caller identification information of the received call; and comparing, at the client, a telephone number contained in the calling party telephone number field of the received call against the assigned telephone number, other than the number of the server initiating the call, indicative of the message waiting notification, to identify a match providing an indication of the existence of the received message at the server.

14. The method recited in claim 13, further including the step of disabling a ringer of a telephone connecting the client to the telephone network when the page is received and the telephone number contained in the calling party telephone number field matches the assigned telephone number indicative of message waiting notifications.

15. The method recited in claim 13, wherein the client is connected to the telephone network via a mobile telephone.

\* \* \* \* \*

UNITED STATES PATENT AND TRADEMARK OFFICE
CERTIFICATE OF CORRECTION

PATENT NO.    : 6,181,928 B1
DATED         : January 30, 2001
INVENTOR(S)   : Billy Gayle Moon It is certified that error appears in the above-identified patent and that said Letters Patent is hereby corrected as shown below:

Column 4,
Lines 27-45, replace "1. A server for sending a notification to a client over a telephone network that the server has received a message for the client, the server comprising:
    a message detector for detecting when the server has received a message for the client; and
    a controller for initiating a telephone call to the client over the telephone network, the controller further for inserting an assigned telephone number, other than the telephone number of the server initiating the telephone call, indicative of a message waiting notification, into a calling party telephone number field of caller identification information transmitted to the client from the server over the telephone network in association with the initiated telephone call, the controller still further the initiated telephone call, the controller still further for inserting information pertaining to characteristics of the received message in a calling party name field of the caller identification information transmitted to the client from the server over the telephone network in association with the initiated telephone call." with -- 1. A server for sending a notification to a client over a telephone network that the server has received a message for the client, the server comprising:
    a message detector for detecting when the server has received a message for the client; and
    a controller for initiating a telephone call to the client over the telephone network, the controller further for inserting an assigned telephone number, other than the telephone number of the server initiating the telephone call, for comparison at the client with an assigned telephone number other than the telephone number of the server indicative of a message waiting notification, into a calling party telephone number field of caller identification information transmitted to the client from the server over the telephone network in association with the initiated telephone call, the controller still further for inserting information pertaining to characteristics of the received message in a calling party name field of the caller identification information transmitted to the client from the server over the telephone network in association with the initiated telephone call. --

Column 5,
Lines 29-39, replace "11. The method for sending a message notification from a server to a client over a telephone network that the server has received a message for the client, comprising the steps of:
    assigning, at the server a telephone number, other than the telephone number of the server, for use in notifying the client over the telephone network of the received message, the telephone number indicative of the existence of the received message;
    inserting, at the server, the assigned telephone number indicative of the message waiting notification into a calling party telephone number field of caller

UNITED STATES PATENT AND TRADEMARK OFFICE
CERTIFICATE OF CORRECTION

PATENT NO. : 6,181,928 B1
DATED : January 30, 2001
INVENTOR(S) : Billy Gayle Moon It is certified that error appears in the above-identified patent and that said Letters Patent is hereby corrected as shown below:

<u>Column 6,</u>
Lines 1-4, identification information created when the telephone call is initiated; and
      calling the client the client over the telephone network." with -- 11. A method for sending a message waiting notification from a server to a client over a telephone network that the server has received a message for the client, comprising the steps of:
      assigning, at the server, a telephone number, other than the telephone number of the server, for use in notifying the client over the telephone network of the received message, the telephone number for comparison at the client with an assigned telephone number other than the telephone number of the server indicative of the existence of the received message;
      inserting, at the server, the assigned telephone number indicative of the message waiting notification into a calling party telephone number field of caller identification information created when the telephone call is initiated; and
      calling the client over the telephone network. --
Line 5, replace "recited to claim 11" with -- recited in claim 11 --
Line 34, replace "notifications" with -- notification --

Signed and Sealed this

Eighteenth Day of March, 2003

JAMES E. ROGAN
*Director of the United States Patent and Trademark Office*